United States Patent
Kim et al.

(10) Patent No.: US 12,092,938 B2
(45) Date of Patent: Sep. 17, 2024

(54) DISPLAY DEVICE HAVING VISUAL ANGLE CONTROL FILM

(71) Applicant: LG DISPLAY CO., LTD., Seoul (KR)

(72) Inventors: Youngtae Kim, Paju-si (KR);
SeungCheol Oh, Paju-si (KR);
Woongjin Seo, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 94 days.

(21) Appl. No.: 17/475,960

(22) Filed: Sep. 15, 2021

(65) Prior Publication Data

US 2022/0206354 A1 Jun. 30, 2022

(30) Foreign Application Priority Data

Dec. 29, 2020 (KR) .......................... 10-2020-0185604

(51) Int. Cl.
*G02F 1/17* (2019.01)
*G02F 1/01* (2006.01)

(52) U.S. Cl.
CPC .............. *G02F 1/17* (2013.01); *G02F 1/0102* (2013.01)

(58) Field of Classification Search
CPC ...... G02F 1/0102; G02F 1/17; G02F 1/33606; G02F 1/133507; G02F 1/133512
See application file for complete search history.

(56) References Cited

U.S. PATENT DOCUMENTS

| 2006/0055858 A1* | 3/2006 | Nakanishi | G02F 1/137 349/139 |
| 2007/0139765 A1 | 6/2007 | Daniel et al. | |
| 2008/0002110 A1 | 1/2008 | Choi | |
| 2011/0080084 A1 | 4/2011 | Cha et al. | |
| 2015/0042935 A1* | 2/2015 | Yamamoto | G02F 1/133512 349/112 |

(Continued)

FOREIGN PATENT DOCUMENTS

| JP | 2005-107011 A | 4/2005 |
| JP | 2006-313360 A | 11/2006 |
| JP | 2007-206373 A | 8/2007 |

(Continued)

OTHER PUBLICATIONS

The extended European Search Report, dated May 13, 2022 issued in Patent Application No. 21210605.8 (7 pages).

(Continued)

*Primary Examiner* — Sharrief I Broome
*Assistant Examiner* — Journey F Sumlar
(74) *Attorney, Agent, or Firm* — POLSINELLI PC

(57) ABSTRACT

A display device having a visual angle control film can attenuate an interference phenomenon between a panel and a visual angle control film and effectively shield unnecessary light of a visual angle, the display device comprises a display panel; and a visual angle control film disposed on the display panel, wherein the visual angle control film may include a plurality of light-shielding patterns for shielding light advancing in a side direction except a front direction of the display panel in a visual angle control mode, and each of the plurality of light-shielding patterns may have a thickness in the range of 8% to 25% of a pixel area of the display panel, an interval in the range of 33% to 39% of the pixel size, and a slope angle in the range of ±5° to 15° based on 90°.

21 Claims, 12 Drawing Sheets

(56) References Cited

U.S. PATENT DOCUMENTS

2015/0301398 A1* 10/2015 Yui .................... G02B 5/0257
349/112
2020/0209702 A1 7/2020 Qu et al.

FOREIGN PATENT DOCUMENTS

| | | |
|---|---|---|
| JP | 2007-256330 A | 10/2007 |
| JP | 2008-026861 A | 2/2008 |
| JP | 2008-107404 A | 5/2008 |
| JP | 2008-185964 A | 8/2008 |
| JP | 2009-025472 A | 2/2009 |
| JP | 2015-114582 A | 6/2015 |
| JP | 2016-062092 A | 4/2016 |
| JP | 2019-514044 A | 5/2019 |
| JP | 2019-095652 A | 6/2019 |
| JP | 2019-101101 A | 6/2019 |
| KR | 2018-0062176 A | 6/2018 |
| WO | 2020/121193 A2 | 6/2020 |

OTHER PUBLICATIONS

Japanese Office Action dated Dec. 8, 2022 issued in Patent Application No. 2021-209155 (7 pages).

* cited by examiner $H_S = W \times \tan \theta_S$, $H_E = W \times \tan \theta_E$ $\theta_S = \tan^{-1}\frac{D}{S}$, $\theta_E = \tan^{-1}\frac{D}{E}$

DISPLAY DEVICE HAVING VISUAL ANGLE CONTROL FILM

CROSS-REFERENCE TO RELATED APPLICATION

This application claims the benefit of the Korean Patent Application No. 10-2020-0185604 filed on Dec. 29, 2020, which is hereby incorporated by reference in its entirety as if fully set forth herein.

BACKGROUND

Field of the Disclosure

The present disclosure relates to a display device having a visual angle control film, which may attenuate an interference phenomenon between a panel and a visual angle control film and effectively shield unnecessary light of a visual angle.

Description of the Background

Among display devices built in a vehicle, a display device arranged in front of a passenger seat provides a user with a desired image but includes a visual angle control film that shields light emitted toward a driver so as not to disturb the driver when the driver drives the vehicle.

As the visual angle control film disposed on a display panel includes a light-shielding pattern for controlling a visual angle, a Moire Artifact which is an interference phenomenon between a pixel structure of the display panel and a light-shielding pattern of the visual angle control film is generated, whereby display performance is deteriorated. In this respect, a method that may attenuate the Moire Artifact is required.

Moreover, the visual angle control film further needs a method that may effectively shield unnecessary light of a visual angle, which is oriented toward the driver.

The disclosure of the above-described background art is owned by the inventor of the present disclosure to devise the present disclosure or is technical information acquired by a process of devising the present disclosure, but cannot be regarded as the known art disclosed to the general public before the present disclosure is disclosed.

SUMMARY

Accordingly, the present disclosure provides a display device having a visual angle control film, which may attenuate an interference phenomenon between a panel and a visual angle control film and effectively shield unnecessary light of a visual angle.

In addition to the technical benefits of the present disclosure as mentioned above, additional technical benefits and features of the present disclosure will be clearly understood by those skilled in the art from the following description of the present disclosure.

A display device according to an aspect of the present disclosure may comprise a display panel; and a visual angle control film disposed on the display panel, wherein the visual angle control film may include a plurality of light-shielding patterns for shielding light advancing in a side direction except for a front direction of the display panel in a visual angle control mode, and each of the plurality of light-shielding patterns may have a thickness in the range of 8% to 25% of a pixel area of the display panel, an interval in the range of 33% to 39% of the pixel size, and a slope angle in the range of ±5° to 15° based on 90°.

In addition to the features of the present disclosure as mentioned above, additional technical benefits and features of the present disclosure will be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate aspects of the disclosure and together with the description serve to explain the principles of the disclosure.

In the drawings.

DETAILED DESCRIPTION

Figure 1:
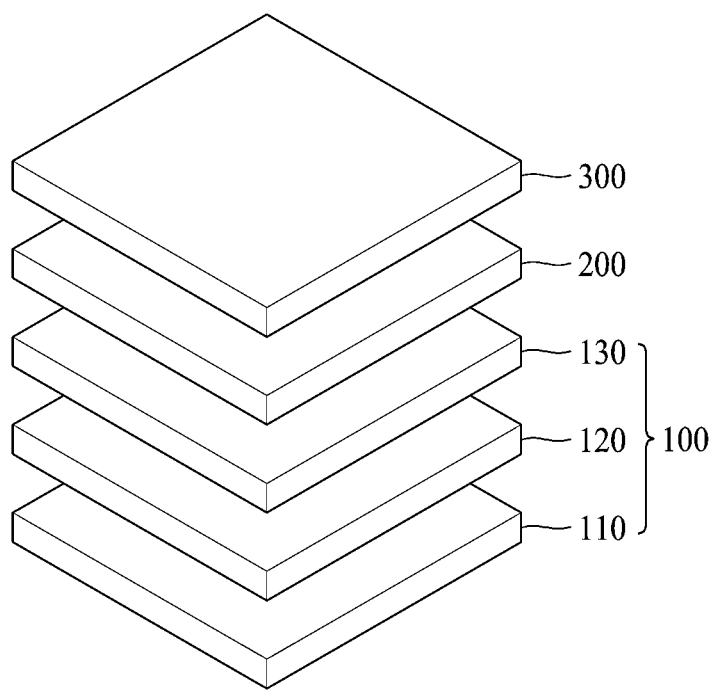
FIG. 1 is a schematic view illustrating a structure of a display device having a visual angle control film according to one aspect of the present disclosure.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing aspects of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted. In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as "on," "over," "under," and "next," one or more other parts may be disposed between the two parts unless a more limiting term, such as "just" or "direct(ly)" is used.

In describing a time relationship, for example, when the temporal order is described as, for example, "after," "subsequent," "next," and "before," a case which is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, the terms "first," "second," "A," "B," "(a)," "(b)," etc., may be used. These terms are intended to identify the corresponding elements from the other elements, and basis, order, or number of the corresponding elements should not be limited by these terms. The expression that an element or a layer is "connected," "coupled," or "adhered" to another element or layer, the element or layer can not only be directly connected or adhered to another element or layer, but also be indirectly connected or adhered to another element or layer with one or more intervening elements or layers "disposed" between the elements or layers, unless otherwise specified.

The term "at least one" should be understood as including any and all combinations of one or more among the associated listed elements. For example, the meaning of "at least one or more of a first element, a second element, and a third element" denotes the combination of all elements proposed from two or more of the first element, the second element, and the third element as well as the first element, the second element, or the third element.

Features of various aspects of the present disclosure may be partially or overall coupled to or combined with each other, and may be variously inter-operated with each other and driven technically as those skilled in the art can sufficiently understand. The aspects of the present disclosure may be carried out independently from each other, or may be carried out together in co-dependent relationship.

Hereinafter, the aspect of the present disclosure will be described with reference to the accompanying drawings. Since a scale of each of elements shown in the accompanying drawings is different from an actual scale for convenience of description, the present disclosure is not limited to the shown scale.

Figure 2:
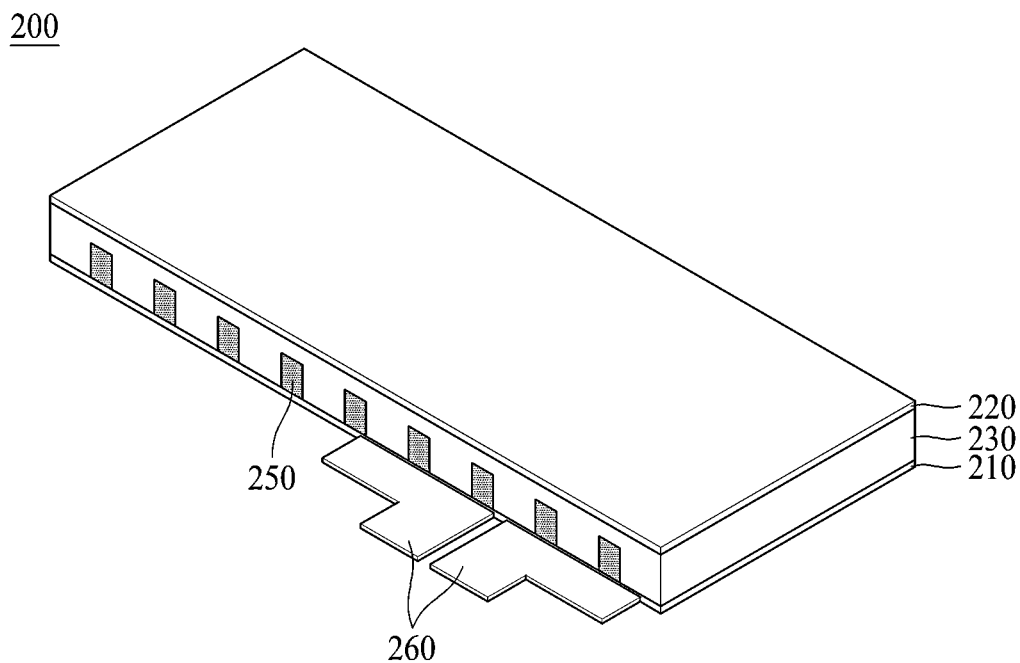
FIG. 2 is a stereoscopic view illustrating a structure of a visual angle control film according to one aspect of the present disclosure.
Figure 3:
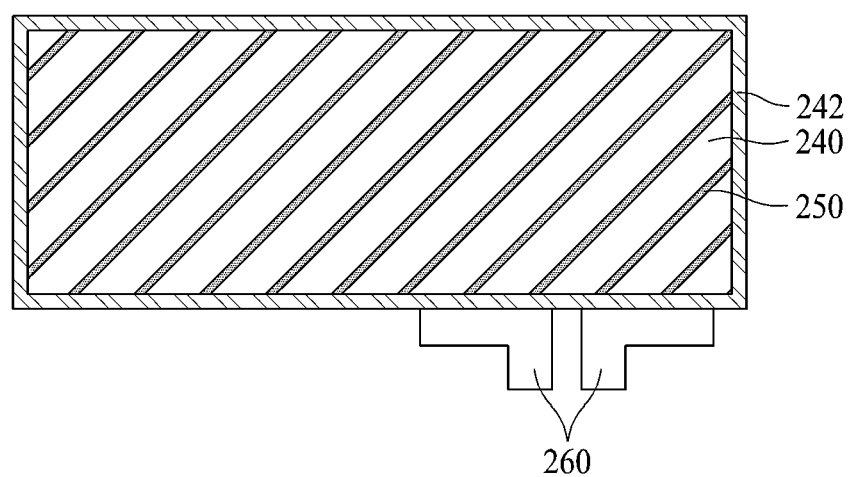
FIG. 3 is a top view illustrating a visual angle control film according to one aspect of the present disclosure.

FIG. 1 is a schematic view illustrating a structure of a display device having a visual angle control film according to one aspect of the present disclosure, FIGS. 2 and 3 are stereoscopic view and top view illustrating a visual angle control film according to one aspect of the present disclosure, and FIGS. 4A-4B and 5A-5B are views illustrating operation states of a visual angle control mode and a visual angle non-control mode of a visual angle control film according to one aspect of the present disclosure.

Referring to FIG. 1, the display device according to one aspect of the present disclosure may include a visual angle control film 200 disposed on a display panel 100 and a cover substrate 300.

The display panel 100 may include a display 110 including a pixel array in which a plurality of pixels is disposed, a polarizer 120 disposed on the display 110, and a touch sensor 130 disposed on the polarizer 120. The touch sensor 130 may be omitted from the display panel 100.

The display panel 100 may be any one of various display panels such as a liquid crystal display panel, an electroluminescent display panel, and a micro light emitting diode (LED) display panel. The electroluminescent display panel may be an Organic Light Emitting Diode (OLED) display panel, a Quantum-dot Light Emitting Diode display panel, or an Inorganic Light Emitting Diode display panel.

Referring to FIGS. 2 and 3, the visual angle control film 200 may include a first substrate 210 in which a first transparent electrode is disposed, a second substrate 220 in which a second transparent electrode is disposed, a transparent insulating layer 230 disposed between the first and second substrates 210 and 220, and a light-shielding pattern 250 disposed in a plurality of grooves formed in the transparent insulating layer 230.

Each of the first transparent electrode disposed in the first substrate 210 and the second transparent electrode disposed in the second substrate 220 may be supplied with a driving voltage applied from a driving circuit through an FPC 260.

The light-shielding pattern 250 may be formed of a light-shielding material that absorbs light, and may be formed of an electronic ink that includes light-shielding particles moving in accordance with the voltages applied to the first and second transparent electrodes.

The light-shielding pattern 250 is disposed to overlap a display area 240 in which the pixel array for displaying an image on the display panel 100 is positioned. The display area 240 has a structure surrounded by a bezel area 242. The light-shielding pattern 250 may be disposed in an oblique shape of a diagonal direction in the display area 240, but may be disposed in various shapes without being limited thereto.

The light-shielding pattern 250 may be driven in accordance with the driving voltages applied to the first and second transparent electrodes of the first and second substrates 210 and 220, whereby a light-shielding height may be adjusted in accordance with a visual angle control mode and a visual angle non-control mode.

Figure 4A:
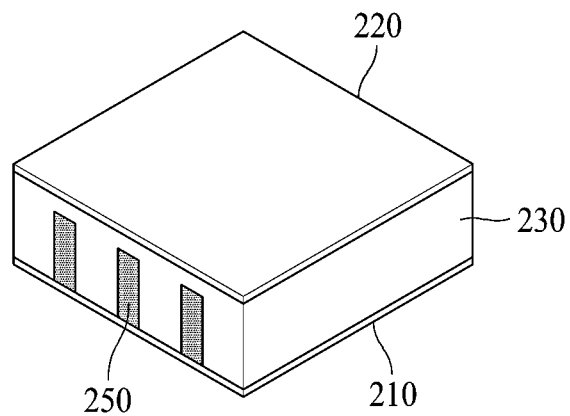
FIGS. 4A-4B and 5A-5B are views illustrating operation states of a visual angle control mode and a visual angle non-control mode of a visual angle control film according to one aspect of the present disclosure.
Figure 5A:
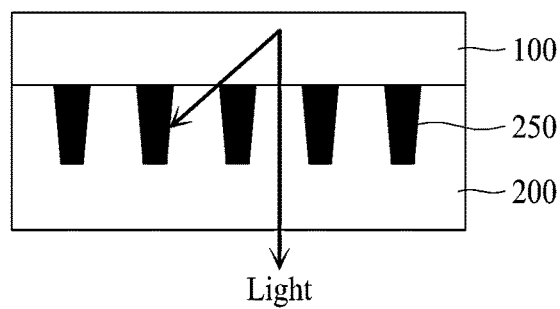

Referring to FIGS. 4A and 5A, in the visual angle control mode, the light-shielding pattern 250 driven in accordance with a first driving voltage applied to the first and second transparent electrodes of the first and second substrates 210 and 220 may be diffused in all the grooves of the transparent insulating layer 230, whereby the light-shielding height of the light-shielding pattern 250 may be increased to be equal to a groove height. The visual angle control film 200 may transmit light emitted from the display panel 100 toward a front direction in the visual angle control mode, but light advancing in a left or right side direction where a driver is positioned may be shielded by the light-shielding pattern 250.

Figure 4B:
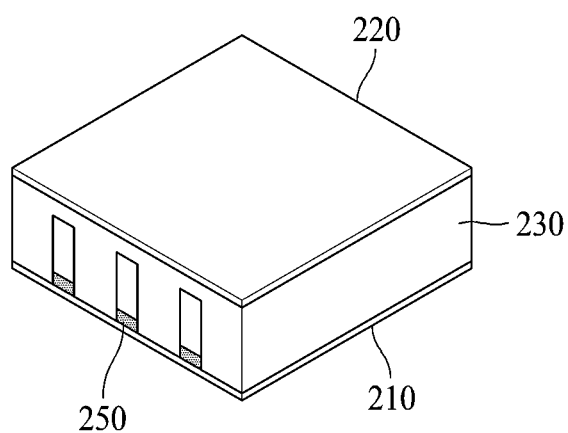
Figure 5B:
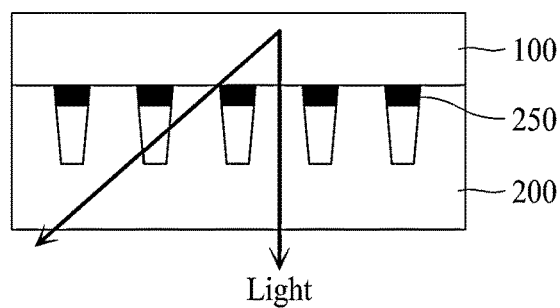

Referring to FIGS. 4B and 5B, in the visual angle non-control mode, the light-shielding pattern 250 may be driven in accordance with a second driving voltage applied to the first and second transparent electrodes of the first and second substrates 210 and 220, whereby the light-shielding height of the light-shielding pattern 250 may be reduced such that the light-shielding pattern 250 may be positioned only in a bottom portion of the transparent insulating layer 230 adjacent to the display panel 100. The visual angle control film 200 may transmit light, which is emitted from the display panel 100, in both a front direction and a side direction in the visual angle non-control mode. Therefore, when the driver desires to view an image displayed on the display panel 100 like the case that a vehicle does not drive, the visual angle control film 200 may be driven in the visual angle non-control mode, whereby the image displayed on the display panel 100 may be provided to both the driver and a viewer of a passenger seat.

Figure 6:
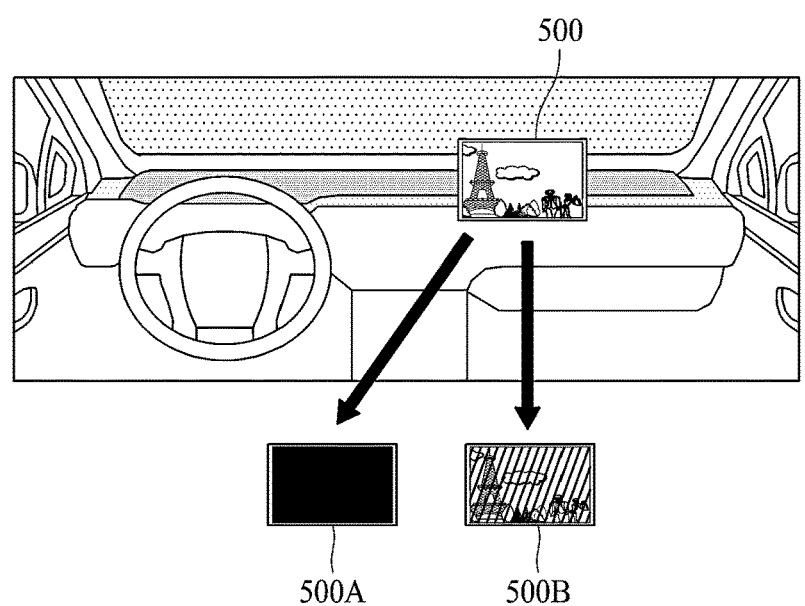
FIG. 6 is a view illustrating a Moire Artifact phenomenon of a display device according to the related art.

FIG. 6 is a view illustrating a Moire Artifact phenomenon of a display device according to the related art.

Referring to FIG. 6, in a display device 500 disposed to face a passenger seat of a vehicle, when the visual angle control film is driven in the visual angle control mode, light oriented toward the driver may be shielded, whereby the driver may view a black screen 500A but a viewer of the passenger seat may view an image 500B where Moire Artifact is generated by the visual angle control film.

In order to attenuate such Moire Artifact, a design range of the visual angle control film according to one aspect may be devised as follows.

Figure 7:
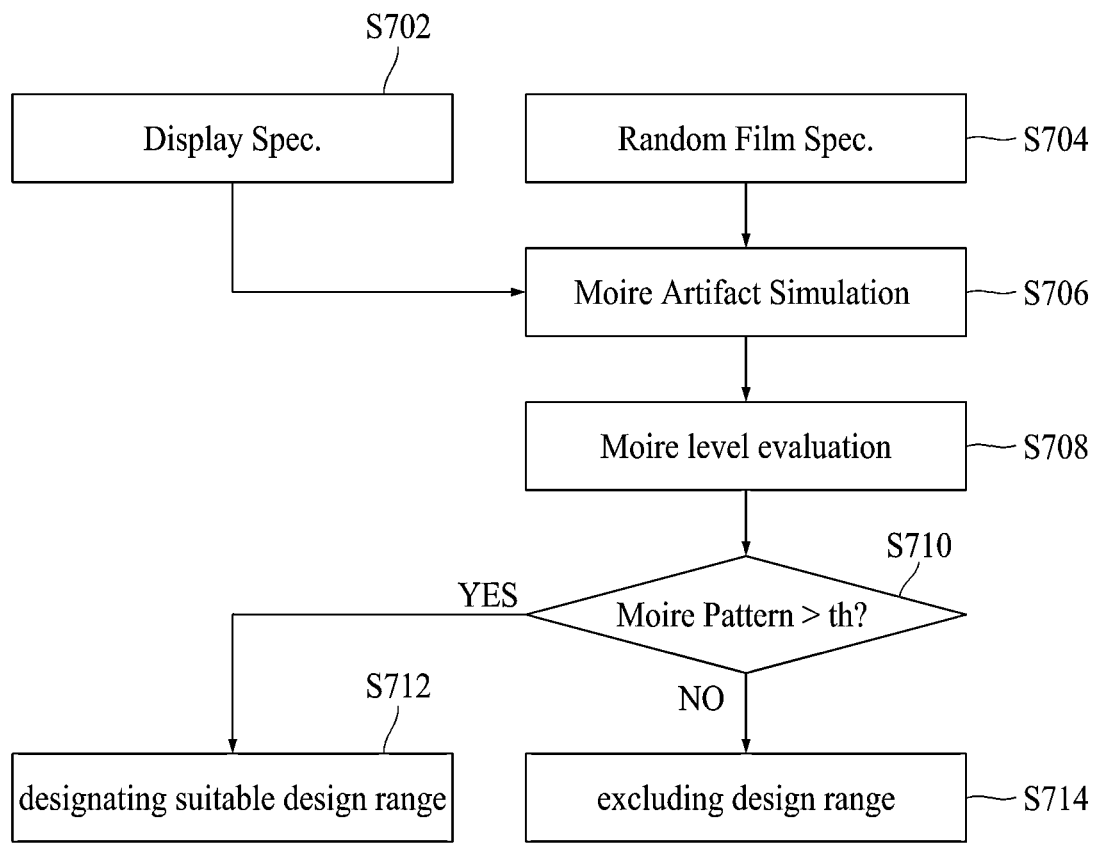
FIG. 7 is a flow chart illustrating a method for devising a design range of a visual angle control film according to one aspect of the present disclosure.

FIG. 7 is a flow chart illustrating a method for devising a design range of a visual angle control film according to one aspect of the present disclosure.

Referring to FIG. 7, the method for devising a design range of the visual angle control film according to one aspect may include applying a spec. (pixel size) of the display panel (S702), applying random specs. (thickness, interval and slope angle of the light-shielding pattern) of the visual angle control film (S704), simulating Moire Artifact (S706), and evaluating Moire level (S708). When an evaluation score of a Moire pattern is greater than a threshold value 'th' (S710), the corresponding spec. (thickness, interval and slope angle of the light-shielding pattern) of the visual angle control film may be determined as a design range suitable for the visual angle control film (S712). On the other hand, when the evaluation score of the Moire pattern is the threshold value 'th' or less (S710), the corresponding spec. (thickness, interval and slope angle of the light-shielding pattern) of the visual angle control film may be excluded from the design range (S714). This method for devising the design range of the visual angle control film may be repeated, whereby the design range of the visual angle control film for attenuating Moire Artifact may be determined (S712).

The method for devising the design range of the visual angle control film according to one aspect may calculate a target range of thickness, interval and slope angle of the light-shielding pattern, which are three design elements of the visual angle control film and may attenuate Moire Artifact, by repeating the steps of FIG. 7.

Figure 8A:
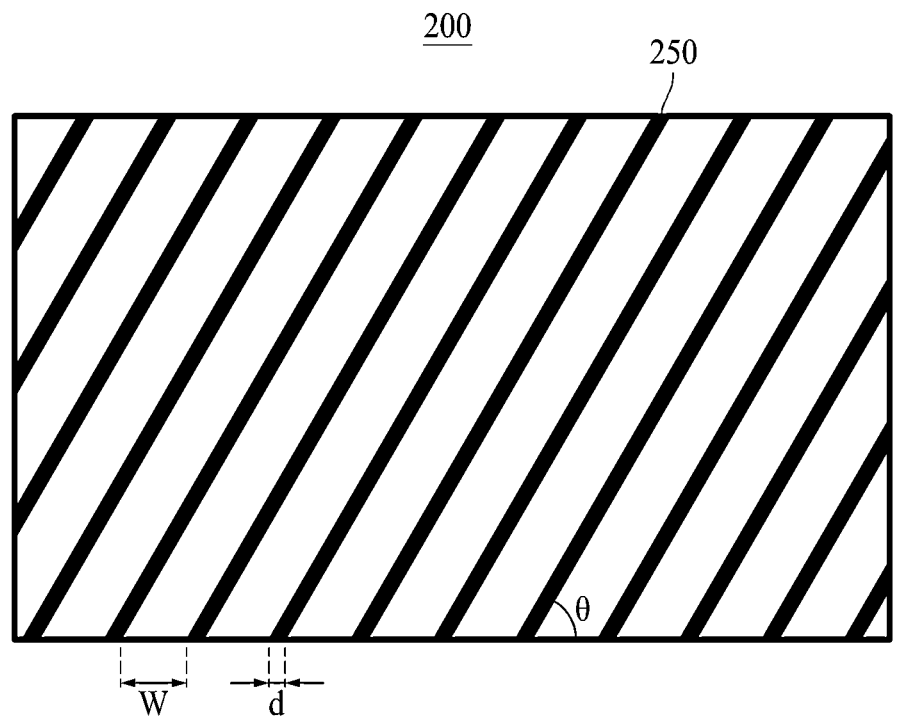
FIGS. 8A-8B are views illustrating three design parameters of a light-shielding pattern in a visual angle control film according to one aspect of the present disclosure.
Figure 8B:
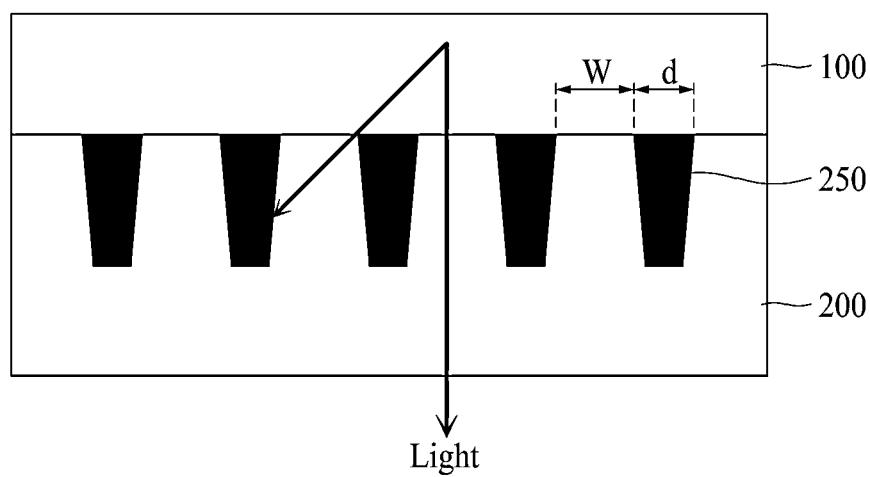

FIGS. 8A-8B are views illustrating design parameters of a light-shielding pattern in a visual angle control film according to one aspect of the present disclosure.

Referring to FIGS. 8A-8B, the visual angle control film 200 may have an optimal design range in an interval W between the light-shielding patterns 250, a thickness 'd' of the light-shielding pattern 250 and a slope angle θ of the light-shielding pattern 250 to attenuate Moire Artifact.

For example, in order to attenuate Moire Artifact, the visual angle control film according to one aspect may be designed to have a thickness 'd' of the light-shielding pattern 250 in the range of 8% to 25% of a pixel size, an interval W between the light-shielding patterns 250 in the range of 33% to 39% of the pixel size, and a slope angle θ of the light-shielding pattern 250 in the range of ±5° to 15° based on 90°, that is, 95° to 105° and 75° to 85° in the visual angle control mode.

Figure 9A:
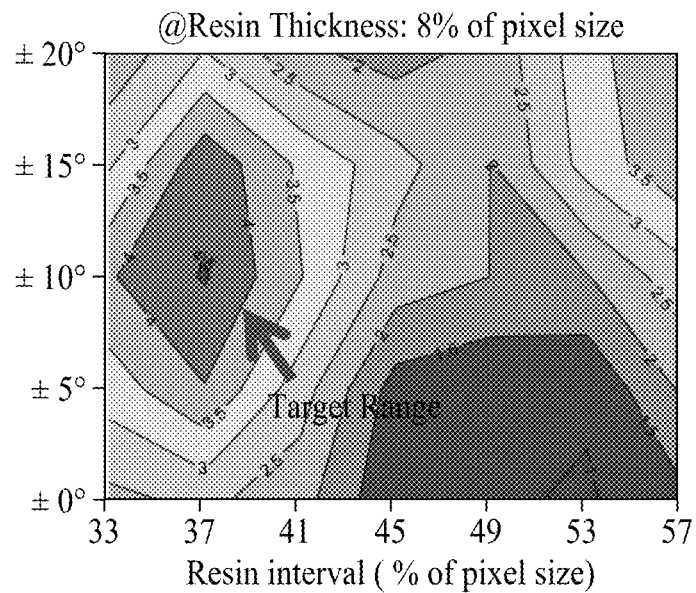
FIGS. 9A-9C are views illustrating a target design range of a visual angle control film according to one aspect of the present disclosure.
Figure 9B:
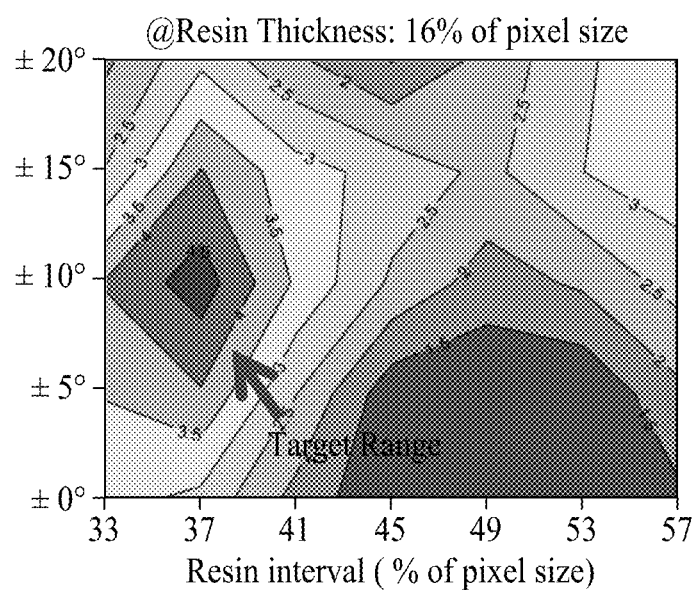
Figure 9C:
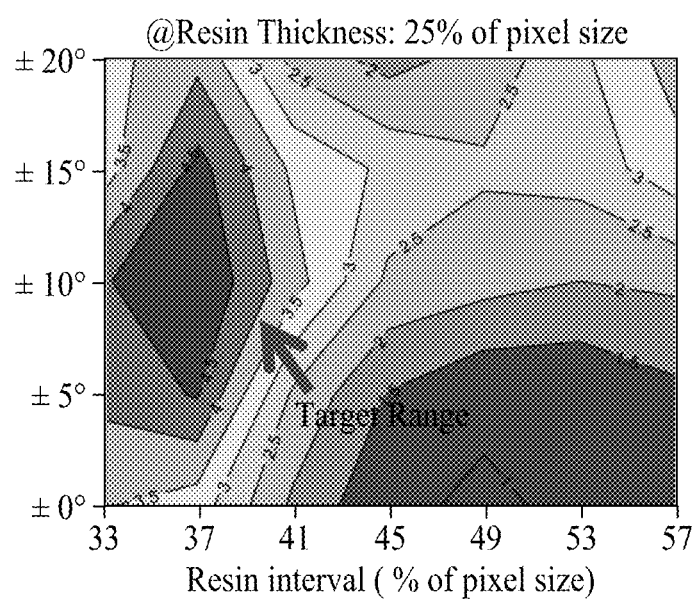

FIGS. 9A-9C are views illustrating a target design range of a visual angle control film according to one aspect of the present disclosure.

Referring to FIGS. 9A-9C, under the condition that the thickness of the light-shielding pattern (Resin) is 8%, 16%, or 25% of the pixel size, the interval of the light-shielding pattern (Resin) is in the range of 33% to 39% of the pixel size and the slope angle (based on 90°) of the light-shielding pattern is in the design range of ±5° to 15°, it is noted that an evaluation score of the Moire pattern has a target range or more (for example, 4 points or more) to attenuate Moire Artifact at a level that is acceptable to a viewer.

Figure 10:
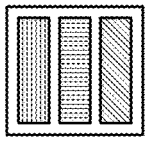
FIG. 10 is a view illustrating a Moire level based on a size change of a pixel and a shape change of the pixel in a display device having a visual angle control film according to one aspect of the present disclosure.

FIG. 10 is a view illustrating a Moire level based on a size change of a pixel and a shape change of the pixel in a display device having a visual angle control film according to one aspect of the present disclosure.

Referring to FIG. 10, as a result of Moire level evaluated when the visual angle control film according to one aspect has a spec. A (thickness, interval and slope angle) of the light-shielding pattern in a target range, it is noted that there is little difference in Moire levels based on a shape change of a pixel or a size change of a pixel. Therefore, the design range of the visual angle control film devised in one aspect may be applied to display panels having various pixel shapes and sizes.

Meanwhile, when the visual angle control film has specs. B and C (thickness, interval and slope angle) gotten out of the target range, it is noted that the Moire level is recognized but there is little difference in Moire levels recognized depending on a shape change of a pixel or size change of a pixel.

In the visual angle control film 200 of the display device according to one aspect, interval W, thickness d, height H, etc. of the light-shielding pattern 250 may be adjusted differently depending on the position on the display panel 100. Therefore, luminance (transmittance) of the display panel 100, which is provided to a first viewer at a passenger seat (a first viewing position), may be improved through the visual angle control film 200 driven in the visual angle control mode, and light oriented toward a driver (a second viewer) of a driver's seat (a second viewing position) may effectively be shielded.

Figure 11:
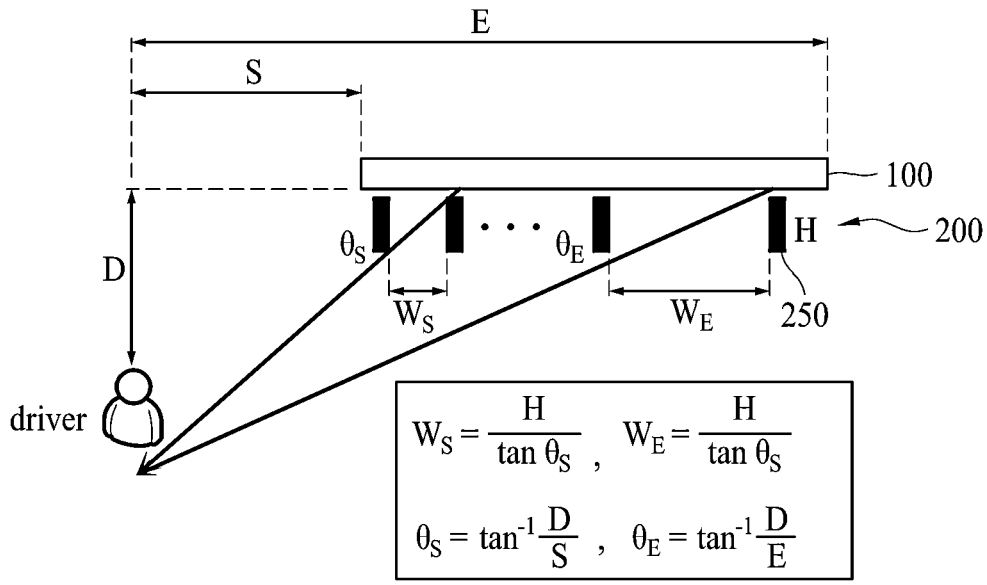
FIG. 11 is a view illustrating differential application of intervals of light-shielding patterns of a visual angle control film according to one aspect of the present disclosure.
Figure 12:
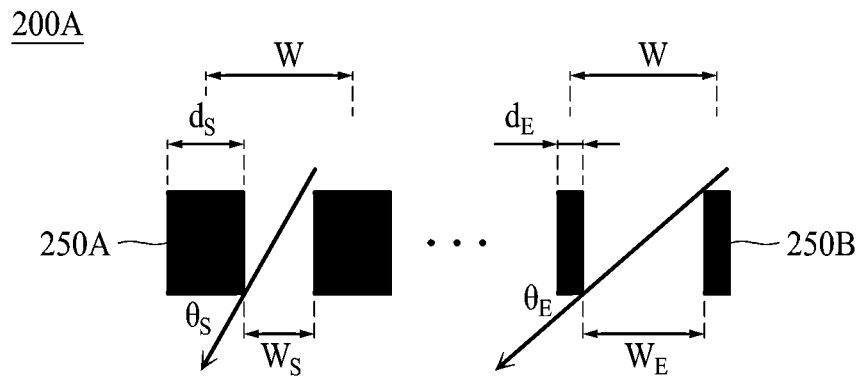
FIG. 12 is a view illustrating differential application of thicknesses of light-shielding patterns of a visual angle control film according to one aspect of the present disclosure.
Figure 13A:
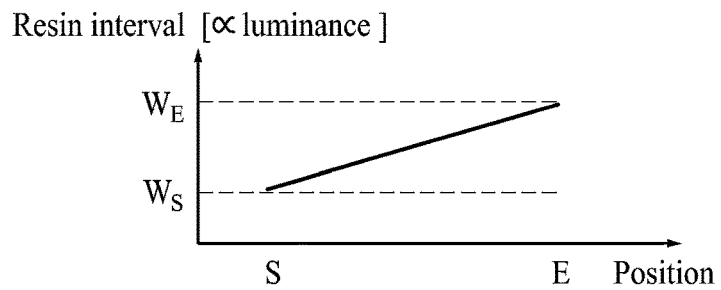
FIGS. 13A-13B are views illustrating an interval adjustment range of light-shielding patterns in a visual angle control film according to one aspect of the present disclosure.
Figure 13B:
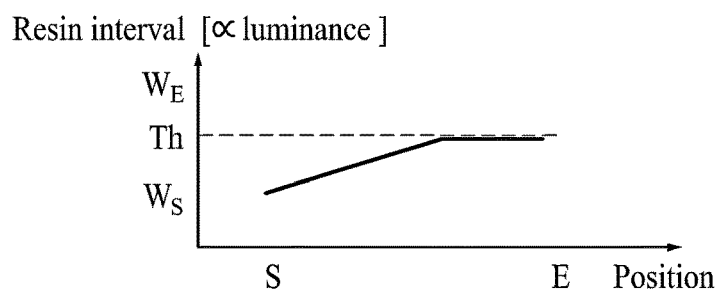
Figure 14:
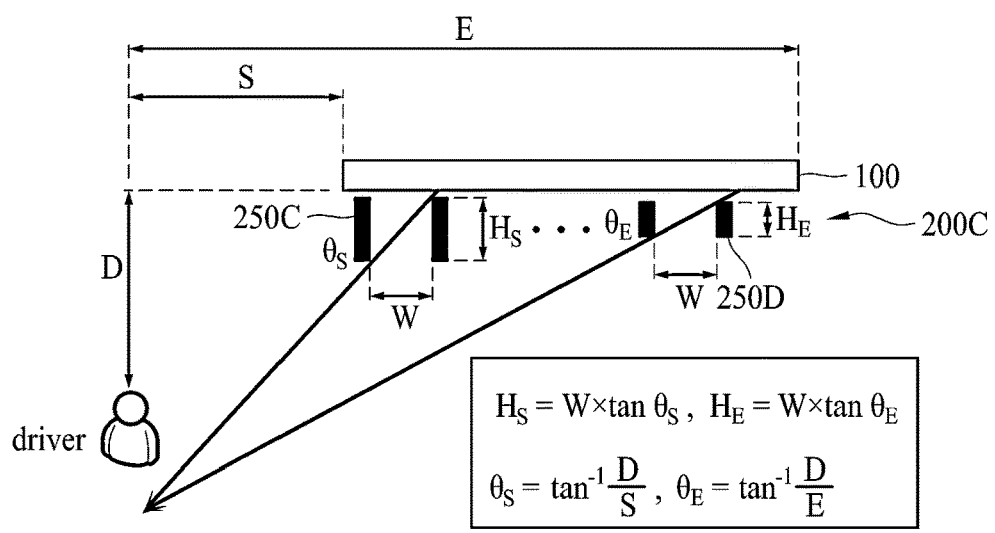
FIG. 14 is a view illustrating differential application of heights of light-shielding patterns of a visual angle control film according to one aspect of the present disclosure.
Figure 15:
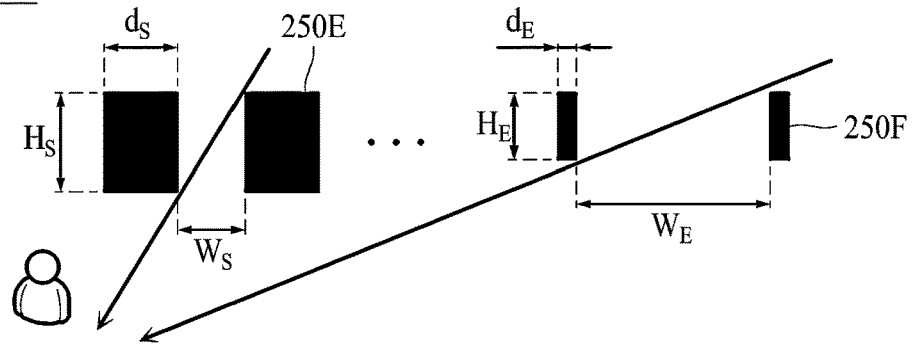
FIG. 15 is a view illustrating differential application of intervals, thicknesses and heights of light-shielding patterns of a visual angle control film according to one aspect of the present disclosure.
Figure 16:
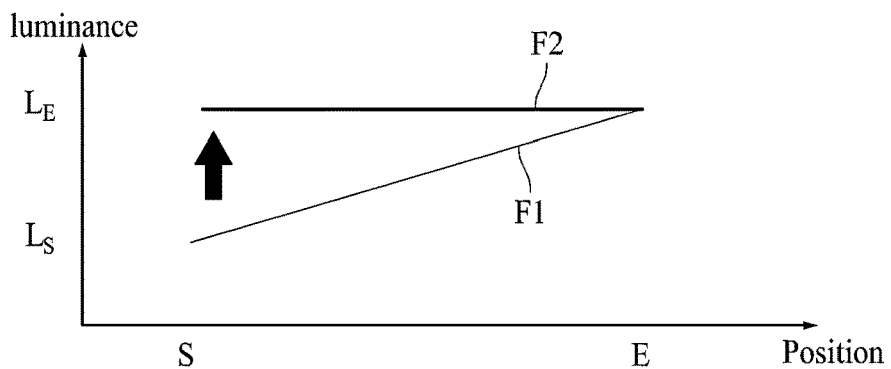
FIGS. 16 and 17 are views illustrating a method for compensating for luminance deviation caused by differential application of intervals of light-shielding patterns of a visual angle control film according to one aspect of the present disclosure.
Figure 17:
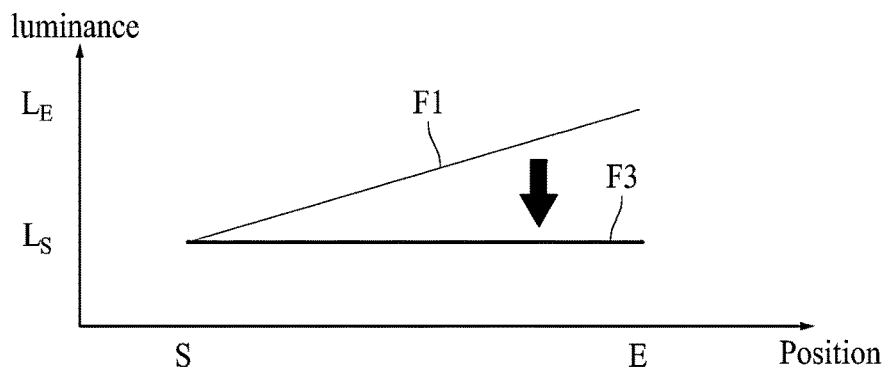

FIG. 11 is a view illustrating differential application of intervals of light-shielding patterns of a visual angle control film according to one aspect of the present disclosure, FIG. 12 is a view illustrating differential application of thicknesses of light-shielding patterns of a visual angle control film according to one aspect of the present disclosure, FIGS. 13A-13B are views illustrating an interval adjustment range of light-shielding patterns of a visual angle control film according to one aspect of the present disclosure, FIG. 14 is a view illustrating differential application of heights of light-shielding patterns of a visual angle control film according to one aspect of the present disclosure, FIG. 15 is a view illustrating differential application of intervals, thicknesses and heights of light-shielding patterns of a visual angle control film according to one aspect of the present disclosure, and FIGS. 16 and 17 are views illustrating a method for compensating for luminance deviation caused by differential application of intervals of light-shielding patterns of a visual angle control film according to one aspect of the present disclosure.

Referring to FIG. 11, in the visual angle control film 200 according to one aspect, intervals $W_S$ and $W_E$ between the light-shielding patterns 250 may be set differently per position on the display panel 100 considering a driver's position, and a thickness $d_S$ and a height H of each light-shielding pattern 250 may equally be set. For a position close to a driver on the display panel 100, the first interval $W_S$ between the light-shielding patterns 250 may be set to be relatively small, and for a position far away from the driver, the second interval $W_E$ between the light-shielding patterns 250 may be set to be greater than the first interval $W_S$.

The intervals $W_S$ and $W_E$ between the light-shielding patterns 250 based on the position on the display panel 100 may be determined as shown in FIG. 11 and expressed by the following Equation 1.

$$W_S = \frac{H}{\tan \theta_S}, W_E = \frac{H}{\tan \theta_S}$$
$$\theta_S = \tan^{-1}\frac{D}{S}, \theta_E = \tan^{-1}\frac{D}{E}$$
[Equation 1]

In FIG. 11 and the above Equation 1, $W_S$ may mean the first interval $W_S$ between the light-shielding patterns 250 in the first position relatively close to the driver on the display panel 100, that is, the first position on the display panel 100 having a first horizontal distance S with the driver. The interval $W_E$ may mean the second interval $W_E$ between the light-shielding patterns 250 in the second position far away from the driver on the display panel 100, that is, the second position on the display panel 100 having a second horizontal distance E greater than the first horizontal distance S with the driver. H may mean the height of the light-shielding pattern 250. $\theta_S$ may mean an angle of light emitted from the first position of the display panel 100, which is relatively close to the driver, to the driver, and may be determined by an arc tangent function of a vertical distance D and the first horizontal distance S between the driver and the display panel 100. $\theta_E$ may mean an angle of light emitted from the second position of the display panel 100, which is relatively far away from the driver, to the driver, and may be determined by an arc tangent function of the vertical distance D and the second horizontal distance E between the driver and the display panel 100.

Referring to FIG. 11 and the Equation 1, in the first position of the display panel 100, which is relatively close to the driver, the first interval $W_S$ between the light-shielding patterns 250 may be determined by a ratio of the height H of the light-shielding pattern 250 to a tangent function of a light emission angle $\theta_S$ of the display panel 100. In the second position of the display panel 100, which is relatively far away from the driver, the second interval $W_E$ between the light-shielding patterns 250 may be determined by a ratio of the height H of the light-shielding pattern 250 to a tangent function of a light emission angle $\theta_E$ of the display panel 100.

Referring to FIG. 12, in a visual angle control film 200A according to one aspect, thicknesses $d_S$ and $d_E$ of light-shielding patterns 250A and 250B and intervals $W_S$ and $W_E$ between the light-shielding patterns 250A and 250B may be set differently per position on the display panel 100 considering a driver's position, and a height H of each light-shielding pattern 250 may equally be set. The first thickness $d_S$ of the first light-shielding pattern 250A disposed in the first position close to the driver on the display panel 100 may be set to be relatively great, the first interval $W_S$ between the first light-shielding patterns 250A may be set to be relatively small, the second thickness $d_E$ of the second light-shielding pattern 250B disposed in the second position far away from the driver may be set to be smaller than the first thickness $d_S$, and the second interval $W_E$ between the second light-shielding patterns 250B may be set to be greater than the first interval $W_S$.

The first interval $W_S$ between the first light-shielding patterns 250A and the second interval $W_E$ between the second light-shielding patterns 250B based on the position on the display panel 100 may be determined by the above Equation 1. The first thickness $d_S$ of the first light-shielding pattern 250A having the first interval $W_S$ and the second thickness $d_E$ of the second light-shielding pattern 250B having the second interval $W_E$ may be determined as shown in FIG. 12 and expressed by the following Equation 2.

$$d_S = W - W_S, d_E = W - W_E$$
[Equation 2]

In FIG. 12 and the above Equation 2, W may mean a certain interval W between the light-shielding patterns 250A and 250B.

Referring to FIG. 12 and the Equation 2, the first thickness $d_S$ of the first light-shielding pattern 250A having the first interval $W_S$ in the first position close to the driver may be determined by a difference between the certain interval W and the first interval $W_S$, and the second thickness $d_E$ of the second light-shielding pattern 250B having the second interval $W_E$ in the second position far away from the driver may be determined by a difference between the certain interval W and the second interval $W_E$.

Referring to FIG. 13A, the intervals $W_S$ and $W_E$ between the light-shielding patterns 250 may be set to be increased as the horizontal distances S and E with the driver are increased, but their variable range may be set to a threshold value Th as shown in FIG. 13B and thus limited to the range of 33% to 39% of a pixel size for preventing Moire from occurring when exceeding the threshold value Th.

Referring to FIG. 14, in a visual angle control film 200C according to one aspect, heights $H_S$ and $H_E$ of light-shielding patterns 250C and 250D may be set differently per position on the display panel 100 considering a driver's position, intervals W between the light-shielding patterns 250C and 250D may equally be set, and thicknesses of the light-shielding patterns 250C and 250D may equally be set. The first height $H_S$ of the first light-shielding pattern 250C may be set to be relatively high for a position close to the driver on the display panel 100, and the second height $H_E$ of the second light-shielding pattern 250D may be set to be lower than the first height $H_S$ for a position far away from the driver.

The heights $H_S$ and $H_E$ of the light-shielding patterns 250C and 250D based on the position on the display panel 100 may be determined as shown in FIG. 14 and expressed by the following Equation 3.

$$H_S = W \times \tan \theta_S, H_E = W \times \tan \theta_E \qquad \text{[Equation 3]}$$
$$\theta_S = \tan^{-1}\frac{D}{S}, \theta_E = \tan^{-1}\frac{D}{E}$$

In FIG. 14 and the above Equation 3, $H_S$ may mean the first height $H_S$ of the first light-shielding pattern 250C in the first position relatively close to the driver on the display panel 100, that is, the first position on the display panel 100 having a first horizontal distance S with the driver. The height $H_E$ may mean the second height $H_E$ of the second light-shielding patterns 250D in the second position far away from the driver on the display panel 100, that is, the second position on the display panel 100 having a second horizontal distance E greater than the first horizontal distance S with the driver. $\theta_S$ may mean an angle of light emitted from the first position of the display panel 100, which is relatively close to the driver, to the driver, and may be determined by an arc tangent function of a vertical distance D and the first horizontal distance S between the driver and the display panel 100. $\theta_E$ may mean an angle of light emitted from the second position of the display panel 100, which is relatively far away from the driver, to the driver, and may be determined by an arc tangent function of the vertical distance D and the second horizontal distance E between the driver and the display panel 100.

Referring to FIG. 14 and the Equation 3, in the first position of the display panel 100, which is relatively close to the driver, the first height $H_S$ of the first light-shielding pattern 250C may be determined by a multiplication result of a tangent function of the light emission angle $\theta_S$ of the display panel 100 and the interval W between first the light-shielding patterns 250C. In the second position of the display panel 100, which is relatively far away from the driver, the second height $H_E$ of the second light-shielding pattern 250D may be determined by a multiplication result of a tangent function of the light emission angle $\theta_E$ of the display panel 100 and the interval W between the second light-shielding patterns 250D.

Referring to FIG. 15, in a visual angle control film 200E according to one aspect, thicknesses $d_S$ and $d_E$ of light-shielding patterns 250E and 250F, intervals $W_S$ and $W_E$ between the light-shielding patterns 250E and 250F and heights $H_S$ and $H_E$ of the light-shielding patterns 250E and 250F may be set differently per position on the display panel 100 considering a driver's position.

The thicknesses $d_S$ and $d_E$ of the light-shielding patterns 250E and 250F, the intervals $W_S$ and $W_E$ between the light-shielding patterns 250E and 250F and the heights $H_S$ and $H_E$ of the light-shielding patterns 250E and 250F per position on the display panel 100 considering the driver's position in FIG. 15 may be determined by the aforementioned Equations 1 to 3.

In FIG. 15, the first thickness $d_S$ and the first height $H_S$ of the first light-shielding pattern 250E disposed in the first position close to the driver on the display panel 100 may be set to be relatively great, whereas the first interval $W_S$ between the first light-shielding patterns 250E may be set to be relatively small. The second thickness $d_E$ and the second height $H_E$ of the second light-shielding pattern 250F disposed in the second position far away from the driver may be set to be smaller than the first thickness $d_S$ and the first height $H_S$, respectively, and the second interval $W_E$ between the second light-shielding patterns 250F may be set to be greater than the first interval $W_S$.

In this way, the visual angle control film and the display device having the same according to one aspect may improve transmittance through the visual angle control film by differentially applying the thicknesses and the intervals of the light-shielding patterns of the visual angle control film depending on the position on the display panel considering the driver's position, whereby luminance of the display device may be improved.

The visual angle control film and the display device having the same according to one aspect may save the manufacturing cost of the visual angle control film by differentially applying the heights of the light-shielding patterns of the visual angle control film depending on the position on the display panel considering the driver's position.

Referring to FIGS. 16 and 17, when the intervals $W_S$ and $W_E$ between the light-shielding patterns 250 in the visual angle control film according to one aspect are differentially applied in accordance with the position, the intervals $W_S$ and $W_E$ between the light-shielding patterns 250 are increased in accordance with the increase of the horizontal distances S and E with the driver, whereby transmittance of light advancing toward a front side, that is, luminance F1 may be increased from $L_S$ to $L_E$ and therefore luminance deviation F1 which is transmittance deviation may be generated in accordance with the position of the display panel.

Referring to FIG. 16, the luminance deviation F1 per position based on the differential application of the intervals $W_S$ and $W_E$ between the light-shielding patterns 250 in the visual angle control film may be increased to the luminance F2 by allowing low luminance $L_S$ in the display panel to be equal to high luminance $L_E$, thereby uniformly compensating for luminance deviation. As a result, picture quality may be improved, and total luminance of the display device may be improved.

Referring to FIG. 17, the luminance deviation F1 per position based on the differential application of the intervals $W_S$ and $W_E$ between the light-shielding patterns 250 in the visual angle control film may be reduced to the luminance F3 by allowing high luminance $L_E$ in the display panel to be equal to low luminance $L_S$, thereby uniformly compensating for luminance deviation. As a result, picture quality may be improved, and power consumption of the display device may be reduced.

In the display device according to one or more aspects of the present disclosure, as the visual angle control film has a thickness range, an angle range and an interval range of the light-shielding pattern, which are devised to minimize the Moire Artifact, the Moire Artifact may be minimized without being affected by a pixel shape and size of the display panel, whereby display performance may be improved.

In the display device according to one or more aspects of the present disclosure, at least one of an interval, a thickness or a height of the light-shielding pattern may differentially be applied depending on the position on the display panel having a different distance from a driver, whereby unnecessary light of the visual angle toward the driver may effectively be shielded, and at the same time luminance of an image provided to a viewer located at a passenger seat may be improved or the manufacturing cost of the visual angle control film may be reduced.

The display device according to one or more aspects of the present disclosure may provide uniform luminance by compensating for luminance deviation per position based on at least one differential application of an interval or a thickness of the light-shielding pattern in the visual angle control film, thereby improving display performance, and improving luminance or reducing power consumption.

A display device according to one or more aspects of the present disclosure will be described below.

A display device according to an aspect of the present disclosure may comprise a display panel; and a visual angle control film disposed on the display panel, wherein the visual angle control film may include a plurality of light-shielding patterns for shielding light advancing in a side direction except for a front direction of the display panel in a visual angle control mode, and each of the plurality of light-shielding patterns may have a thickness in the range of 8% to 25% of a pixel area of the display panel, an interval in the range of 33% to 39% of the pixel size, and a slope angle in the range of ±5° to 15° based on 90°.

The visual angle control film may include a first substrate in which a first transparent electrode is disposed; a second substrate in which a second transparent electrode is disposed; and a transparent insulating layer disposed between the first and second substrates, having grooves in which the plurality of light-shielding patterns are disposed, and a light-shielding height of each of the plurality of light-shielding patterns may be varied in a visual angle control mode and a visual angle non-control mode in accordance with driving voltages applied to the first and second transparent electrodes.

The visual angle control film is positioned in the side direction of the display panel, and at least one of thicknesses, intervals or heights of the plurality of light-shielding patterns may be set differently in accordance with a position on the display panel considering a viewer's position to which the visual angle control mode is applied.

In the visual angle control film, a first interval of a first light-shielding pattern positioned in a first position close to the viewer may be set to be smaller than a second interval of a second light-shielding pattern positioned in a second position further away from the viewer than the first position, a thickness of the first light-shielding pattern may be equal to that of the second light-shielding pattern, and a height of the first light-shielding pattern may be equal to that of the second light-shielding pattern.

In the visual angle control film, a first thickness of a first light-shielding pattern positioned in a first position close to the viewer may be set to be greater than a second thickness of a second light-shielding pattern positioned in a second position further away from the viewer than the first position, a first interval between the first light-shielding patterns may be set to be smaller than a second interval between the second light-shielding patterns, and a height of the first light-shielding pattern may be equal to that of the second light-shielding pattern.

In the visual angle control film, a first height of a first light-shielding pattern positioned in a first position close to the viewer may be set to be higher than a second height of a second light-shielding pattern positioned in a second position further away from the viewer than the first position, a thickness of the first light-shielding pattern may be equal to that of the second light-shielding pattern, and an interval between the first light-shielding patterns may be equal to that between the second light-shielding patterns.

In the visual angle control film, a first thickness of a first light-shielding pattern positioned in a first position close to the viewer may be set to be greater than a second thickness of a second light-shielding pattern positioned in a second position further away from the viewer than the first position, a first interval between the first light-shielding patterns may be set to be smaller than a second interval between the second light-shielding patterns, and a first height of the first light-shielding pattern may be set to be higher than a second height of the second light-shielding pattern.

In the visual angle control film, the interval between the light-shielding patterns may gradually be increased as the light-shielding pattern is far away from the viewer.

In the visual angle control film, the interval between the light-shielding patterns may gradually be increased, and the thickness of the light-shielding pattern may gradually be reduced as the light-shielding pattern is far away from the viewer.

In the visual angle control film, the height of the light-shielding pattern may gradually be reduced as the light-shielding pattern is far away from the viewer.

In the visual angle control film, the interval between the light-shielding patterns may gradually be increased, the thickness of the light-shielding pattern may gradually be reduced, and the height of the light-shielding pattern may gradually be reduced as the light-shielding pattern is far away from the viewer.

The interval between the light-shielding patterns, which is increased in accordance with the distance between the viewer and the light-shielding pattern, may be set within a threshold value that limits the interval in the range of 33% to 39% of the pixel size.

Transmittance deviation of the visual angle control film based on the interval between the light-shielding patterns, which is different in accordance with the position of the display panel, may be compensated through luminance control of the display panel.

It will be apparent to those skilled in the art that the present disclosure described above is not limited by the above-described aspects and the accompanying drawings and that various substitutions, modifications, and variations can be made in the present disclosure without departing from the spirit or scope of the disclosures. Consequently, the scope of the present disclosure is defined by the accompanying claims, and it is intended that all variations or modifications derived from the meaning, scope, and equivalent concept of the claims fall within the scope of the present disclosure.

What is claimed is:
1. A display device comprising:
    a display panel having a front surface and one or more sides and including a plurality of pixels each having an area; and
    a visual angle control film disposed on the display panel, wherein the visual angle control film includes a plurality of light-shielding patterns configured to allow light emitted from the display panel to advance from the front surface of the display panel while the light is blocked from advancing from the one or more sides, wherein each of the plurality of light-shielding patterns has a thickness and makes an angle with respect to a horizontal width of the visual angle control film, wherein the thickness is contained within a range of 8% to 25% of the area of each of the plurality of pixels, wherein the angle is within a range of 95° to 105° or 75° to 85°, wherein an interval between two adjacent ones of the plurality of light-shielding patterns is within a range of 33% to 39% of the area of each of the plurality of pixels, and wherein the visual angle control film is aligned with the one or more sides of the display panel, and at least one of thicknesses, intervals or heights of the plurality of light-shielding patterns is set differently in accordance with a position on the display panel considering a position of a viewer to which a visual angle control mode is applied.

2. The display device of claim 1, wherein the visual angle control film further includes:
a first substrate in which a first transparent electrode is disposed;
a second substrate in which a second transparent electrode is disposed; and
a transparent insulating layer disposed between the first and second substrates, having grooves in which the plurality of light-shielding patterns are disposed,
wherein a light-shielding height of each of the plurality of light-shielding patterns is varied in a visual angle control mode and a visual angle non-control mode in accordance with driving voltages applied to the first and second transparent electrodes.

3. The display device of claim 1, wherein, in the visual angle control film,
a first interval of a first light-shielding pattern positioned in a first position close to the viewer is set to be smaller than a second interval of a second light-shielding pattern positioned in a second position further away from the viewer than the first position,
a thickness of the first light-shielding pattern is equal to that of the second light-shielding pattern, and
a height of the first light-shielding pattern is equal to that of the second light-shielding pattern.

4. The display device of claim 3, wherein the first interval between the first light-shielding patterns is set by applying a vertical distance between the viewer and the display panel, a first horizontal distance between the viewer and the first position of the display panel and the height of the first light-shielding pattern, and
wherein the second interval between the second light-shielding patterns is set by applying a vertical distance between the viewer and the display panel, a second horizontal distance between the viewer and the second position of the display panel and the height of the second light-shielding pattern.

5. The display device of claim 1, wherein, in the visual angle control film,
a first thickness of a first light-shielding pattern positioned in a first position close to the viewer is set to be greater than a second thickness of a second light-shielding pattern positioned in a second position further away from the viewer than the first position, a first interval between the first light-shielding patterns is set to be smaller than a second interval between the second light-shielding patterns, and
a height of the first light-shielding pattern is equal to that of the second light-shielding pattern.

6. The display device of claim 5, wherein the first interval between the first light-shielding patterns is set by applying a vertical distance between the viewer and the display panel, a first horizontal distance between the viewer and the first position of the display panel and the height of the first light-shielding pattern, and
wherein the second interval between the second light-shielding patterns is set by applying a vertical distance between the viewer and the display panel, a second horizontal distance between the viewer and the second position of the display panel and the height of the second light-shielding pattern.

7. The display device of claim 5, wherein the first thickness of the first light-shielding pattern is set in accordance with the first interval between the first light-shielding patterns, and
the second thickness of the second light-shielding pattern is set in accordance with the second interval between the second light-shielding patterns.

8. The display device of claim 1, wherein, in the visual angle control film,
a first height of a first light-shielding pattern positioned in a first position close to the viewer is set to be higher than a second height of a second light-shielding pattern positioned in a second position further away from the viewer than the first position,
a thickness of the first light-shielding pattern is equal to that of the second light-shielding pattern, and
an interval between the first light-shielding patterns is equal to that between the second light-shielding patterns.

9. The display device of claim 8, wherein the first height of the first light-shielding pattern is set by applying a vertical distance between the viewer and the display panel, a first horizontal distance between the viewer and the first position of the display panel and the interval between the first light-shielding patterns, and
the second height of the second light-shielding patterns is set by applying a vertical distance between the viewer and the display panel, a second horizontal distance between the viewer and the second position of the display panel and the interval between the second light-shielding patterns.

10. The display device of claim 1, wherein, in the visual angle control film,
a first thickness of a first light-shielding pattern positioned in a first position close to the viewer is set to be greater than a second thickness of a second light-shielding pattern positioned in a second position further away from the viewer than the first position,
a first interval between the first light-shielding patterns is set to be smaller than a second interval between the second light-shielding patterns, and
a first height of the first light-shielding pattern is set to be higher than a second height of the second light-shielding pattern.

11. The display device of claim 10, wherein the first interval between the first light-shielding patterns is set by applying a vertical distance between the viewer and the display panel, a first horizontal distance between the viewer and the first position of the display panel and the height of the first light-shielding pattern, and the second interval between the second light-shielding patterns is set by applying a vertical distance between the viewer and the display panel, a second horizontal distance between the viewer and the second position of the display panel and the height of the second light-shielding pattern.

12. The display device of claim 10, wherein the first thickness of the first light-shielding pattern is set in accordance with the first interval between the first light-shielding patterns, and the second thickness of the second light-shielding pattern is set in accordance with the second interval between the second light-shielding patterns.

13. The display device of claim 10, wherein the first height of the first light-shielding pattern is set by applying a vertical distance between the viewer and the display panel, a first horizontal distance between the viewer and the first position of the display panel and the interval between the first light-shielding patterns, and the second height of the second light-shielding patterns is set by applying a vertical distance between the viewer and the display panel, a second horizontal distance between the viewer and the second position of the display panel and the interval between the second light-shielding patterns.

14. The display device of claim 1, wherein, in the visual angle control film, the interval between the light-shielding patterns gradually increases as the light-shielding pattern is far away from the viewer.

15. The display device of claim 14, wherein the interval between the light-shielding patterns, which is increased in accordance with a distance between the viewer and the light-shielding pattern, is set within a threshold value that limits the interval that corresponds to 33% to 39% of the area of each of the plurality of pixels.

16. The display device of claim 1, wherein, in the visual angle control film, the interval between the light-shielding patterns gradually increases, and the thickness of the light-shielding pattern is gradually reduced as the light-shielding pattern is far away from the viewer.

17. The display device of claim 16, wherein the interval between the light-shielding patterns, which is increased in accordance with a distance between the viewer and the light-shielding pattern, is set within a threshold value that limits the interval that is within the range of 33% to 39% of the area of each of the plurality of pixels.

18. The display device of claim 1, wherein, in the visual angle control film, the height of the light-shielding pattern gradually reduces as the light-shielding pattern is far away from the viewer.

19. The display device of claim 1, wherein, in the visual angle control film, the interval between the light-shielding patterns gradually increases, the thickness of the light-shielding pattern is gradually reduced, and the height of the light-shielding pattern is gradually reduced as the light-shielding pattern is far away from the viewer.

20. The display device of claim 19, wherein the interval between the light-shielding patterns, which is increased in accordance with a distance between the viewer and the light-shielding pattern, is set within a threshold value that limits the interval that is within the range of 33% to 39% of the area of each of the plurality of pixels.

21. The display device of claim 1, wherein transmittance deviation of the visual angle control film based on the interval between the light-shielding patterns, which is different in accordance with the position of the display panel, is compensated through luminance control of the display panel.

* * * * *